(12) United States Patent
Ho

(10) Patent No.: US 10,984,599 B1
(45) Date of Patent: Apr. 20, 2021

(54) AUGMENTED REALITY SYSTEM WITH DISPLAY OF OBJECT WITH REAL WORLD DIMENSIONS

(71) Applicant: Chi Fai Ho, Palo Alto, CA (US)

(72) Inventor: Chi Fai Ho, Palo Alto, CA (US)

( * ) Notice: Subject to any disclaimer, the term of this patent is extended or adjusted under 35 U.S.C. 154(b) by 0 days.

(21) Appl. No.: 16/223,099

(22) Filed: Dec. 17, 2018

(51) Int. Cl.
| | |
|---|---|
| *G06T 19/00* | (2011.01) |
| *G06T 15/10* | (2011.01) |
| *G06T 7/20* | (2017.01) |
| *G06K 9/00* | (2006.01) |
| *G06T 19/20* | (2011.01) |
| *G06T 7/50* | (2017.01) |
| *G06T 7/60* | (2017.01) |
| *G06T 7/70* | (2017.01) |

(52) U.S. Cl.
CPC ........ *G06T 19/006* (2013.01); *G06K 9/00664* (2013.01); *G06T 7/50* (2017.01); *G06T 7/60* (2013.01); *G06T 7/70* (2017.01); *G06T 15/10* (2013.01); *G06T 19/20* (2013.01); *G06T 2215/16* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 5,912,671 A | * | 6/1999 | Oka | G06T 15/80 345/427 |
| 6,100,903 A | * | 8/2000 | Goettsche | G06T 11/203 345/442 |
| 2012/0140040 A1 | * | 6/2012 | Sakurai | G06T 19/006 348/46 |
| 2012/0230581 A1 | * | 9/2012 | Miyashita | G06T 19/006 382/154 |
| 2016/0071319 A1 | * | 3/2016 | Fallon | G06T 19/006 345/633 |

* cited by examiner

*Primary Examiner* — Yingchun He
(74) *Attorney, Agent, or Firm* — North Shore Patents, P.C.

(57) ABSTRACT

In an augmented reality (AR) system, a controller receives an image from a camera, obtains a camera distance index, and receives an instruction to display an object onto the image on a display. In response, the controller retrieves real world dimensions of the object, obtains an AR position of the object in an AR coordinate system, and calculates a distance scaling factor based on the distance index and a depth between a viewpoint and the object. The controller transforms the AR position and the real world dimensions of the object into a display position in a display coordinate system and calculates display dimensions for the object based on the distance scaling factor and the real world dimensions of the object. The controller generates a display object image by scaling the object image to the display dimensions and displays the display object image onto the display at the display position.

18 Claims, 8 Drawing Sheets

Object 410

- Real World Object
- Picture
- A Ruler
- A 3D Ruler Grid
- A Measuring Tape
- An Animated Object
- A Video

FIG. 7

AUGMENTED REALITY SYSTEM WITH DISPLAY OF OBJECT WITH REAL WORLD DIMENSIONS

BACKGROUND OF THE INVENTION

Field

This invention relates generally to an image sensor controller, and more specifically, to an augmented reality system comprising the image sensor controller for display of an object with real world dimensions.

Related Art

Supplementing a live view or an indirect image of a physical real world environment with additional objects, artificially generated, real world or real world like, is an important aspect of augmented reality technology. Such augmented reality technology can be found in smart glasses such as Microsoft's HoloLens™, Magic Leap One™, and other head mount devices. The augmented reality technology can also be found in games and applications for mobile devices equipped with a camera such as Pokémon Go™, ARBasketball™, Toyota 86 AR™ Inkhunter™, and Just a Line™. In these example applications of augmented reality technology, artificially generated objects are rendered onto the display together with a live view or an image captured by an image sensor. The objects rendered onto the display either do not have real world dimensions or are rendered without considering the real world dimensions and depth of other objects in the live view or image. Users of the applications are often confused by the relative size of the displayed object, the distance, or the location of the displayed object when users try to blend the object with the surroundings in the live view or image. In one example, a user plays a Pokémon™ game in AR mode. The user cannot tell how far away the animated monster is so as to determine how hard or soft to throw a ball to catch the Pokemon™. In another example, a user plays an AR Lego™ game on a table, which has a number of real Lego™ pieces. The dimensions of the Lego pieces generated and shown by the AR Lego™ game do not match the actual, real world dimensions of the real Lego pieces on the table.

An important part of augmented reality technology is placement of a real world or real world like objects, with real world dimension, at a real world position in the augmented reality space viewed by a user. For example, a 50" television set is to be placed in a live view, at 6 feet away, 3 feet to the left, and 2 feet below the camera of a smartphone held by a user. Another user using a different smartphone would see the same augmented television set. Since the two live views are captured by two different cameras, the two physical worlds captured by the two different cameras would be different, at least according to the two different sets of attributes of the optical lenses of the cameras. Placements of the same television set in the two live views are therefore different. For example, placement of the television set in one view may be 5 pixels wider and 3 pixels longer than the same placement in the second view.

In another example, user takes two photographs of a living room using a camera but uses two different focal lengths when taking the two photographs. User wants to place a picture of her pet Corgi next to a chair in the two photographs. She measures her pet dog to be 12" long and 10" high. The dog's picture would be placed at two different positions and with two different sizes in the two photographs according to the two different focal lengths for the two photographs and the two positions of the chair in the photographs from the camera.

The above scenarios illustrate the need for an augmented reality system with improved display of an object with real world dimensions.

BRIEF SUMMARY OF THE INVENTION

Disclosed herein is a method for displaying objects with real world dimensions in an augmented reality (AR) system and a corresponding system and a computer program product as specified in the independent claims. Embodiments of the present invention are given in the dependent claims. Embodiments of the present invention can be freely combined with each other if they are not mutually exclusive.

According to one embodiment of the present invention, an AR system includes a display having a display coordinate system and a controller. The controller is configured to receive an image from a camera and obtain a distance index for the camera. The controller receives an instruction to display an object onto the image on the display, where the object is associated with an object image. In response to the instruction, the controller retrieves real world dimensions of the object, obtains an AR position of the object in an AR coordinate system, and calculates a distance scaling factor based on the distance index and a depth between a viewpoint and the object. The controller further transforms the AR position of the object and the real world dimensions of the object into a display position in the display coordinate system, based on the distance index and distance scaling factor, and calculates display dimensions for the object based on the distance scaling factor and the real world dimensions of the object. The controller then generates a display object image by scaling the object image to the display dimensions and displays the display object image onto the display at the display position.

BRIEF DESCRIPTION OF THE SEVERAL VIEWS OF THE FIGURES

FIG. 7 illustrates exemplary embodiments of objects to be presented in an augmented reality view over an image.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
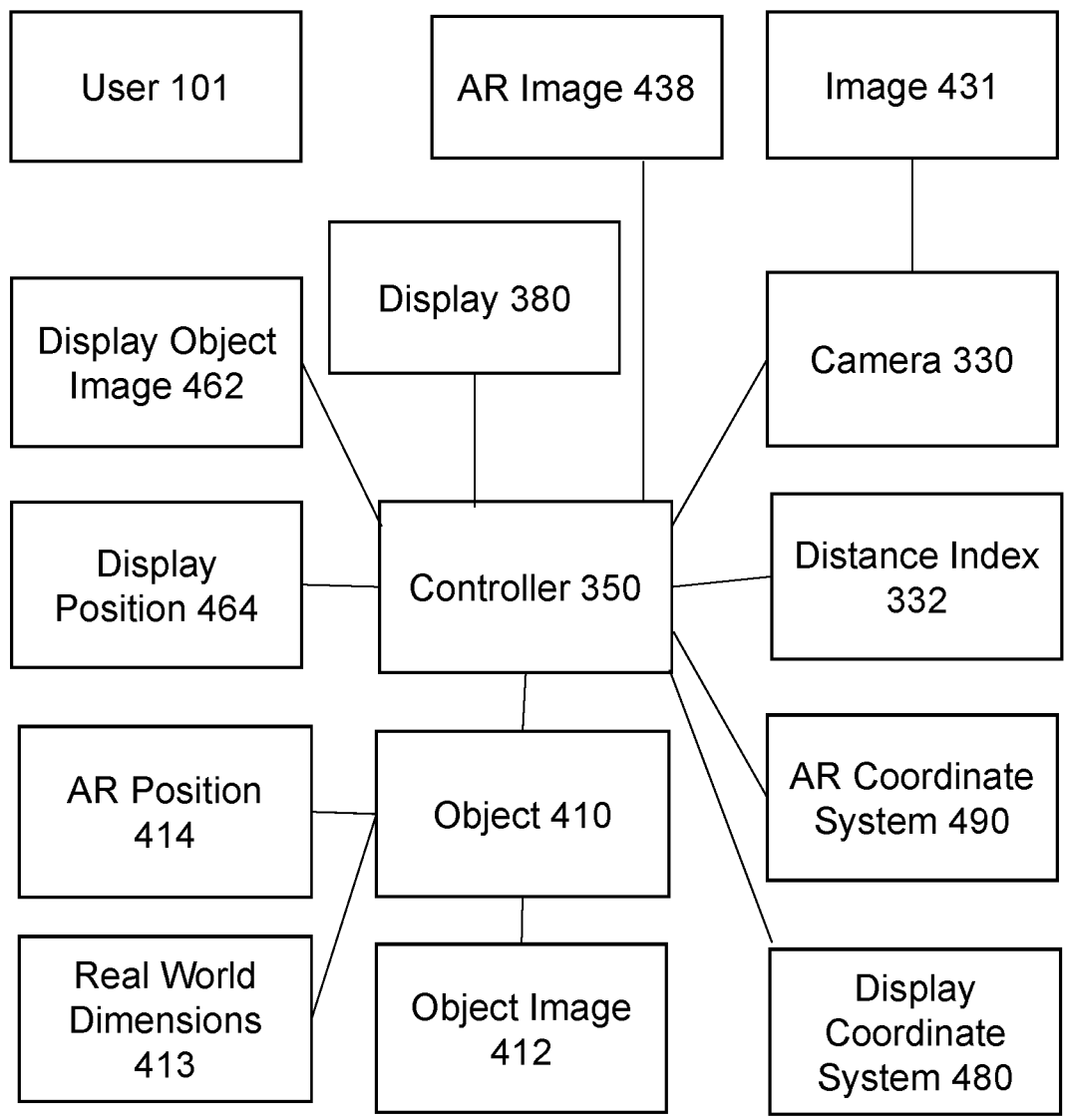
FIG. 1 illustrates an exemplary embodiment of a placement of an object with real world dimensions in an augmented reality coordinate system for display in a display coordinate system.

FIG. 1 illustrates an exemplary embodiment of a placement of an object with real world dimension in an augmented reality coordinate system for display in a display coordinate system. In one embodiment, controller 350 connects to a camera 330 and a display 380. In one embodiment, controller 350 receives image 431 from camera 330 and determines an augmented reality (AR) coordinate system 490 for image 431, based on distance index 332 and an attribute associated with camera 330 when image 431 is captured by camera 330. In one embodiment, controller 350 determines a display coordinate system 480 for displaying images onto display 380. Controller 350 correlates the display coordinate system 480 and the AR coordinate system 490, as described further below. Herein, the AR coordinate system 490 is a coordinate system for an AR space, and the display coordinate system 480 is a coordinate system for a display of images onto the display 380.

In one embodiment, camera 330 captures an image 431 and sends image 431 to controller 350. Controller 350 receives image 431 from the camera 330 and obtains distance index 332 for camera 330. In one embodiment, controller 350 executes instructions to display an object 410 onto image 431. Controller 350 obtains or determines an AR position 414 for object 410 on AR coordinate system 490 and retrieves real world dimensions 413 of object 410. Controller 350 then transforms the AR position 414 in the AR coordinate system 490 and real world dimensions 413 into a display position 464 in the display coordinate system 480, as described further below. In one embodiment, object 410 is associated with an object image 412 (i.e., image of object 410) and controller 350 obtains object image 412 stored with object 410. In one embodiment, object 410 is associated with an object animation and controller 350 generates object image 412 and real world dimensions 413, according to the object animation programming instructions. In one embodiment, controller 350 generates a display object image 462 for object image 412, according to a transformation from AR position 414 in AR coordinate system 490 to a display position 464 in display coordinate system 480. Controller 350 combines display object image 462 and image 431 into an AR image 438 using display position 464. In one embodiment, controller 350 copies image 431 into AR image 438 and overlays display object image 462 at a position according to display position 464. In one embodiment, controller 350 modifies image 431, such as removing or cropping a portion of image 431, prior to overlaying display object image 462. In one embodiment, image 431 includes one or more sub-images. For example, image 431 includes several people where each person is a sub-image. The controller 350 overlays display object image 462 as if display object image 462 is resides between two sub-images of image 431. In one embodiment, controller 350 displays AR image 438 onto display 380.

In one embodiment, controller 350 calculates display position 464 to place display object image 462 to appear on display 380 as if object 410 is at a certain distance away from user 101 or camera 330 and with real world dimensions relative to other objects in image 431. In one embodiment, real world dimensions 413 of object 410 indicates a size of 6 feet wide, 2 feet tall, and 1 foot deep. Placement of display object image 462 into AR image 438 results in a scaled display of object 410 with a size relative to a recognizable object in image 431 and at about the same distance away from user 101 as the recognized object in image 431.

In one embodiment, controller 350 retrieves a pre-stored image 431 from a data store. In one embodiment, controller 350 obtains a pre-stored distance index 332 associated with camera 330. In one embodiment, controller 350 determines distance index 332 by processing image 431. In one embodiment, the distance index 332 and the image 431 are previously stored together in the data store and controller 350 retrieves distance index 332 from the pre-stored image 431 in the data store.

In one embodiment controller 350 includes a computing device housed in a smartphone, a head-mounted device (HMD), a glass frame, a goggle, a binocular, a magnifying glass, a helmet, a pen, a dress pin, a headset, a wearable device, a watch, a belt, a mobile computing device, a portable device, or a device user 101 carries conveniently.

In one embodiment, controller 350, camera 330 and display 380 are housed in a pair of glasses. Display 380 may include a display on the glasses, a projector projecting onto the glasses, a liquid crystal embedded within the glasses, or a projector projecting images onto eyes of user 101. Camera 330 may be mounted onto the frame of the glasses. Camera 330 may include at least two cameras, at least one camera on each side of the glasses. Controller 350 may be attached to the frame of the glasses, or may include a removable module attaching to the frame of the glasses.

In one embodiment, display 380 includes a large display, such as 8 feet, 20 feet or 6 feet long. Display 380 may be mounted inside a window, a door, or an interior wall. Camera 330 may be mounted outside a window, or on an exterior wall. Camera 330 may take a picture outside the window, or outdoor, showing view of a street, an ocean, a mountain, a garden or an exterior view. Controller 350 may include a computing device connected to camera 330 through a wireless network or a local area network (LAN). Controller 350 may connect directly via a cable to display 380, or indirectly through a wireless neatwork. In one embodiment, image 431 captured by camera 330 includes a garden view outside a window. In one embodiment, object 410 includes a pet, a dog, a person, an animation of a person walking. Controller 350 combines object 410 and image 431 into AR image 438 and displays AR image 438 onto display 380 to show the person walking in the garden. In one embodiment, camera 330 is mounted outside a window on $40^{th}$ floor of a building capturing an aerial city view. Object 410 may include a bird, an airplane, a drone, or an animation of object 410 flying. Controller 350 combines object 410 and image 431 into AR image 438 and displays AR image 438 onto display 380, for example mounted inside a window, to show a bird flying over the city.

In one embodiment, a smartphone includes controller 350, camera 330, and display 380. In one embodiment, object 410 includes a ruler or a measuring tape where real world dimensions 413 includes the physical length of the ruler or the measuring tape. User 101 can use display object 462 of the ruler or measuring tape to measure items in image 431. In one embodiment, object 410 includes an item, such as an animated animal, in a video game. Controller 350 combines object 410 and image 431 captured by camera 330 to allow user 101 to play an augmented reality video game using the smartphone. In this embodiment, object 410 is displayed using real world dimensions 413, allowing controller 350 to display object 410 accurately with other items in image 431 recognizable by controller 350.

In one embodiment, a pair of goggles includes controller 350, display 380 and camera 330. In one embodiment, the goggles are used by user 101 to perform a task, such as inspecting or repairing a watch, a machine, an electronic device. Object 410 may include a tool, a component, a part or a machinery part, or a video or an animation showing how object 410 is used. Controller 350 combines the image 431 showing a view of the machine or device under repair or inspection and object 410 to show user 101 how to use a tool to replace a part of the machine. Controller 410 uses real world dimensions 413 of object 410 to generate AR image 438, allowing user 101 to accurately perform the task.

In one embodiment, camera 330 includes an optical camera, an IR or near IR camera allowing image 431 to be captured in the dark, or an imaging sensor containing one or more lenses. In one embodiment, camera 330 is housed together with controller 350 in a device such as a smartphone, a glass frame, a goggle, a HMD, a dress pin, a pen or a portable chassis. In one embodiment, camera 330 is housed in a separate containing unit and is connected to controller 350 over a wire, a connector, or a wireless network, allowing controller 350 to receive image 431 from camera 330. In one embodiment, camera 330 may be housed in a pen or a pin whereas controller 350 is housed in a HMD, a pair of glasses, a helmet, a smartphone, a laptop, or a personal computer. In one embodiment, camera 330 may be housed in a second computing device remotely connected from controller 350, such as a remote-controlled car, a drone, a small flying robot or object, a small robot, a HMD worn by a guide dog, a rescue dog, or an automobile. In this embodiment, controller 350 receives image 431 and other images captured by camera 330 through the second computing device over a data network or a wireless network.

In one embodiment, camera 330 is housed in a way image 431 is captured as if image 431 is directly seen by user 101. In one embodiment, camera 330 is housed near user 101's eye. In one embodiment, camera 330 is housed near a guide dog's eye, a robot's head, or a car's wind shield such that image 431 suggests it is seen directly through user 101's eyes, or it is viewed in a first-person view. In one embodiment, camera 330 is mounted onto a wall, a post, on top of a helmet or backpack, or behind user 101 such that image 431 suggests it is seen indirectly by user 101, or in a third-person view.

In one embodiment, AR coordinate system 490 is a 3D coordinate system for a space within which image 431 resides, where an AR position in AR coordinate system 490 is a point in this space. In one embodiment, AR coordinate system 490 is the space within which image 431 resides as seen by camera 330, or as seen by user 101 while viewing image 431. In one embodiment, the z-axis of AR coordinate system 490 is a depth axis, where points along the z-axis represents the distance or depth from camera 330 or user 101. In one embodiment, the x-axis of AR coordinate system 490 is a horizontal axis, where points long the x-axis represents a horizontal line seen from camera 330 or user 101, and the y-axis of AR coordinate system 490 is a vertical axis, where points along the y-axis represents a vertical line seen from user 101 or camera 330. In one embodiment, the distance or depth is indicated by a line in AR coordinate system 490. In one embodiment, the smaller the distance the object 410 is from user 101, the larger the display object image 462 is when generated in the AR image 438 using AR position 414 of the object 410. The larger the distance the object 410 is away from the user 101, the smaller the display object image 462 is when generated in the AR image 438 using another AR position of object 410. In this embodiment, display object image 462 of AR position 414 has a larger dimension in AR image 438 than the display object image corresponding to a further away AR position.

In one embodiment, display coordinate system 480 is a coordinate system for display 380. A position in display coordinate system 480 corresponds to a point or pixel displayable on display 380. In one embodiment, the x-axis of display coordinate system 480 is a horizontal axis. The x-axis can be a line at the bottom, the top, or parallel to the bottom or the top line of display 380. In one embodiment, the y-axis of display coordinate system 480 is a vertical axis. The y-axis can be a line at the left most, the right most, or a line parallel to the left most or the right most line of display 380. In one embodiment, controller 380 displays points in the entirety of the display coordinate system 480 onto display 380. In one embodiment, controller 380 displays a portion of the points in the display coordinate system 480 onto display 380. In one embodiment, controller 380 scales display coordinate system 480 prior to displaying points in the display coordinate system 480 onto display 380. In one embodiment, display coordinate system 480 has the origin point (0,0) at the bottom left corner of display 380. In one embodiment, (0,0) of display coordinate system 480 is at the top left corner, top right corner, or center of display 380.

In one embodiment, display 380 includes 2160×1080 pixel display, a 2K display, a 2160×1440, 2560×1440, 640×480, 4K, 5K, 5120×2880, 1900×1200, 1200×800 pixel display. In one embodiment, display coordinate system 480 is of dimension (0,0)-(2160,1080), (−1080, −540)-(1080, 540), (0,0)-(infinity, infinity), (−5000, −4000)-(5000, 4000), or (0,0) (16737, 12000).

In one embodiment, object 410 is a real world object such as a cat, a dog, a pet, a chair, a table, a car, or a television set. In one embodiment, object 410 is an object generated by a plurality of programming instructions, a software generated animation, a video, a picture, or an image. Additional embodiments of object 410 are illustrated further below. In one embodiment, object image 412 is an image or picture of object 410. In one embodiment, object image 412 includes a 3-D rendering or a 3-D image of object 410. In one embodiment, object image 412 is generated by a software program or an animation software. In one embodiment, real world dimensions 413 represent real world physical dimensions of object 410 as opposed to dimensions of an image of the object 410. In one embodiment, real world dimensions 413 indicate physical dimensions of 12"×1"×0.2", 30 cm×3 cm×69 mm, 5'×1'×1", 10 mm×2 mm×1 m. In one embodiment, object 412 includes a plurality of parts such as a head, a body, a hand, a leg, a limb, a tail. Real world dimensions 413 may include a plurality of physical dimensions corresponding to the plurality of parts of object 412.

Figure 2:
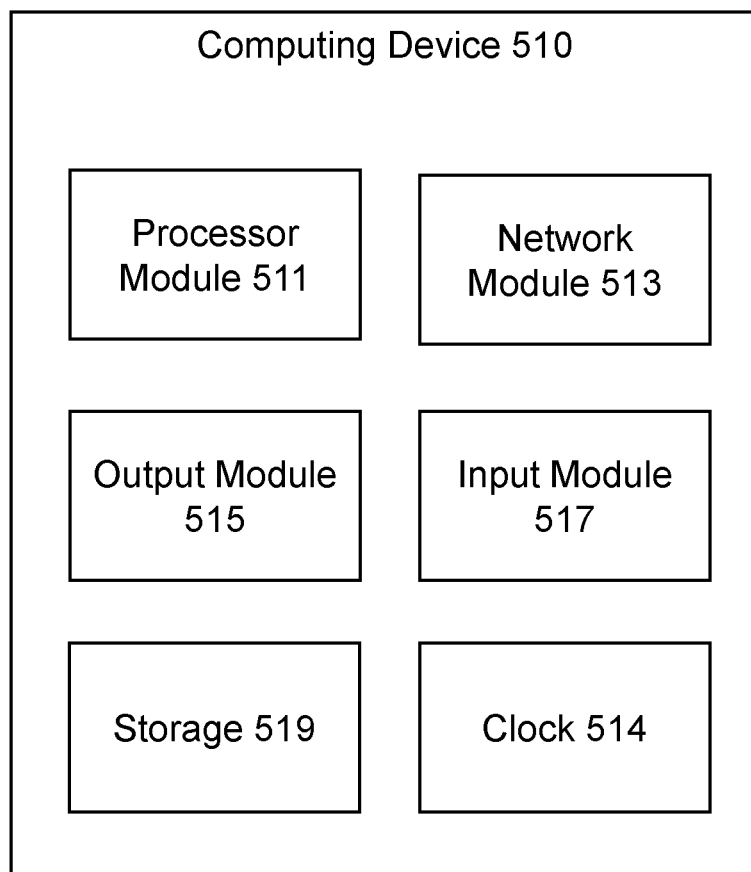
FIG. 2 illustrates an embodiment of a computing device.

FIG. 2 illustrates an exemplary embodiment of hardware components of a computing device which can be used for a controller or to house a controller. In one embodiment, computing device 510 includes a processor module 511, an output module 515, an input module 517, and a storage module 519. In one embodiment, computing device 510 may include a network module 513 or a clock 514. In one embodiment, processor module 511 includes one or more general processors, a multi-core processor, an application specific integrated circuit based processor, a system on a chip (SOC) processor or an embedded processor. In one embodiment, output module 515 includes or connects to a display for displaying video signals, images and text, and an audio speaker to play sound signals. In one embodiment, output module 515 includes a data interface such as USB, HDMI, DVI, DisplayPort, thunderbolt or a wire-cable connecting to a display or a speaker. In one embodiment, output module 515 connects to a display or a speaker using a wireless connection or a wireless data network. In one embodiment, input module 517 includes a physical or logical keyboard, buttons, keys, or microphones. In one embodiment, input module 517 includes or connects to one or more sensors such as a camera sensor, an optical sensor, a night-vision sensor, an infrared (IR) sensor, a motion sensor, a direction sensor, a proximity sensor, a gesture sensor, or other sensors that is usable by a user to provide input to computing device 510. In one embodiment, input module 517 includes a physical panel housing one or more sensors. In one embodiment, storage 519 includes a storage medium, a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a wireless data network such as a cellular network, a mobile network, a Bluetooth network, a NFC network, a personal area network (PAN), a WiFi network, or a LiFi network. Storage 519 includes executable instructions when read and executed by the processor module 511 of computing device 510 implement one or more functionality of the current invention. In one embodiment, storage 519 stores images, pictures, data associated to the stored images or pictures, one or more attributes associated to one or more sensors connected to computing device 510.

In one embodiment computer device 510 includes a clock 514, which provides date and time information to computing device 510.

In one embodiment, computing device 510 does not include all the modules. In one embodiment, computing device 510 does not have network module 513 or clock 514.

Figure 3A:
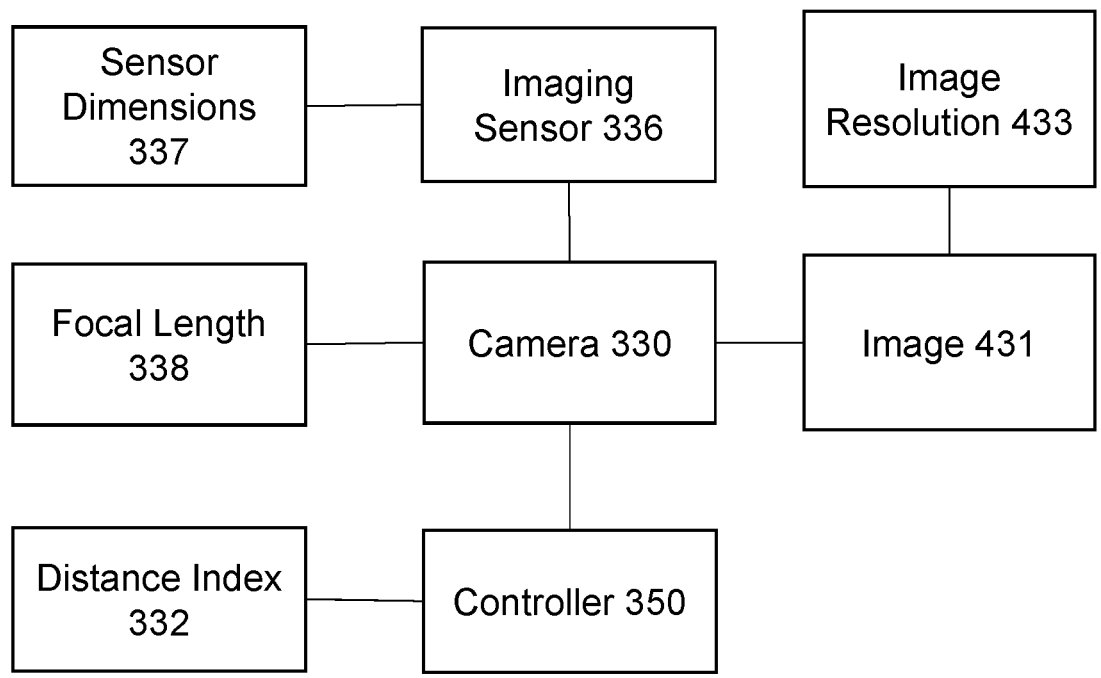
FIG. 3a illustrates an exemplary embodiment to calculate a distance index of an image captured by a camera.

FIG. 3a illustrates an exemplary embodiment to calculate a distance index of an image captured by a camera. In one embodiment, camera 330 contains an optical module with an imaging sensor 336. In one embodiment, imaging sensor 336 has sensor dimensions 337. In one embodiment, camera 330 captures an image 431 using a focal length 338 of imaging sensor 336 with an image resolution 433. In one embodiment, image sensor dimensions 337 indicate a field of view of lens of imaging sensor 336. In one embodiment, focal length 338 of imaging sensor 336 may be 4 mm, 29 mm, 35 mm, 45 mm, 80 mm, or a focal length measured in different unit length. In one embodiment, focal length 338 measures a focal length equivalent of an optical lens of imaging sensor 336. In one embodiment, sensor dimensions 337 describes an area of image sensor 336 such as 4.17 mm, 3.2 mm, or a length measured in different unit length. In one embodiment, sensor dimensions 337 includes a field of view of camera 330, which allows controller 350 to calculate the sensor dimensions 337 corresponding to an equivalent area of image sensor 336 according to the field of view. Upon receiving image 431 from camera 330, controller 350 obtains image resolution 433, sensor dimensions 337 and focal length 338 from camera 330. In one embodiment, sensor dimensions 337 is previously stored in a data store, and camera 330 retrieves sensor dimensions 337 from the data store. In one embodiment, controller 350 instructs camera 330 to capture image 431 using focal length 338 and image resolution 433. In one embodiment, focal length 338 and image resolution 433 are attributes of camera 330 and are pre-stored in a data store. Controller 350 obtains focal length 338 and image resolution 433 from the data store. In one embodiment, image resolution 433 is 4096 pixels wide, 3K pixels, 13M pixels (about 4K pixels by 3K pixels).

In one embodiment, controller 350 calculates distance index 332 using the formula:

$$\text{Distance Index } 332 = \text{Image Resolution } 433 * (\text{Focal Length } 338 / \text{Sensor Dimensions } 337)$$

In one embodiment, image resolution 433 is 4032 pixels wide, focal length 432 is 4 mm, and image sensor dimensions 434 are 4.17 mm. Distance index 432 would be calculated as 3867.63.

Figure 3B:
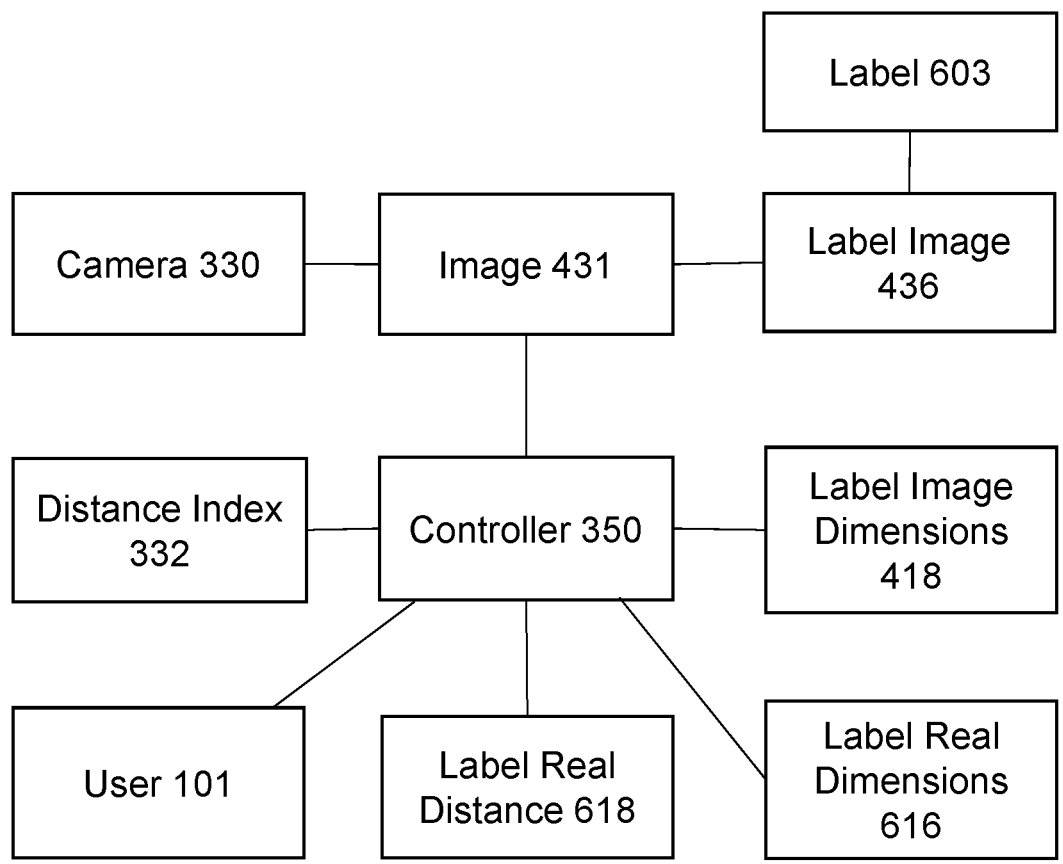
FIG. 3b illustrates an exemplary embodiment to calculate a distance index of a camera based on a label in an image.

FIG. 3b illustrates an exemplary embodiment to calculate a distance index of a camera based on a label in an image. In one embodiment, image 431 includes a label image 436, which is an image of a label 603. Label 603 may include a bar code, a QR code, a 2-dimensional bar code, a 3-dimensional bar code, a pattern, a colored pattern, a black-and-white pattern, a colored blob, a sequence of one or more characters, a product code, a serial number, or a textual description, or an image recognizable by controller 350. In one embodiment, label 603 may include a physical object such as a coffee cup, a printed book, an electronic device, an appliance, an equipment, a stove, a coffee pot, a desk, a table, a cereal box, a loaf of bread, an everyday object that can be recognized by controller 350 using label image 436. In one embodiment, controller 350 calculates distance index 332 based on image 431 and label image 436 inside image 431. In one embodiment, controller 350 processes image 431 and recognizes label image 436 inside image 431. Controller 350 further processes image 431 to determine label image 431 represents label 603. In one embodiment, controller 350 determines the size of the label image 436 to be the label image dimensions 418. In one embodiment, label image 436 includes a bar code, and controller 350 calculates label image dimensions 418 being the width, the height, in pixels or other unit of length, between the left most bar and the right most bar. In one embodiment, label image 436 includes a QR code and controller 350 measures label image dimensions 418 being the width and/or height of the QR code, between the left-most identified black block and the right-most black block, or between the top black block and the bottom black block. In one embodiment, label image 436 includes a colored area and controller 350 calculates label image dimensions 418 as the width and/or height between the left boundary and the right boundary of the colored area, or between the top boundary and the bottom boundary of the colored area.

In one embodiment, controller 350 recognizes label 603 and determines the real world dimensions of label 603, referred to herein as the label real dimensions 616. In one embodiment, label real dimensions 616 includes one or more of a length, a height, a width, a diagonal length of label 603. For example, label real dimensions 616 indicate a length of 1 inch, 18 inches, 1.2 cm, 200 cm or 20 mm, dimensions of 1 inch×0.75 inch, 15 inches×8 inches, 2 cm×1.5 cm, or a diagonal length of 5 inches or 40 inches. In one embodiment, controller 350 uses label 603 to obtain label real dimensions 616 using a network computer over a data network or matching a table in a storage module connected to controller 350. In one embodiment, label 603 may include a serial number, a product code, a bar code, a QR-code, a piece of text, a string of alpha numeric characters, a pixel pattern or a printed code. Controller 350 uses label 603 to determine label real dimensions 616. In one embodiment, label 603 includes label real dimensions 616. For example, label 603 includes an alpha numeric string that includes "dimensions: 2 inches wide", "2 cm×2 cm", "1.2 cm×2.5 cm", "D:mm:3:4" to indicate the dimensions are 3 mm×4 mm, or "diagonal 3 in" to indicate diagonal dimensions of 3 inches. In one embodiment, controller 350 uses label 603 to query another computing device to obtain label real dimensions 616. In one embodiment, controller 350 matches label 603 with a pre-stored table to retrieve label real dimensions 616. In one embodiment, controller 350 receives from user 101 an input of label real dimensions 616.

In one embodiment, controller 350 determines real world distance of label 603 from camera 330 when image 431 is captured by camera 330, referred to herein as the label real distance 618. In one embodiment, image 431 includes an indication of label real distance 618 and controller 350 retrieves label real distance 618 from image 431. In one embodiment, controller 350 receives a user 101 input of label real distance 618. In one embodiment, controller 350 asks user 101 to place label 603 at a pre-determined label real distance 618 and instructs camera 330 to capture image 431.

Upon determining label real distance 618, label real dimensions 616 and label image dimensions 418, controller 350 calculates distance index 332 as Distance Index 332=label image dimensions 418* (label real distance 618/label real dimensions 616)

In one embodiment, label real dimensions 616 is 1 inch, label real distance 618 is 1 foot and label image dimensions 418 is 352 pixel. Controller 350 calculates distance index 332 to be 3744.

Figure 4:
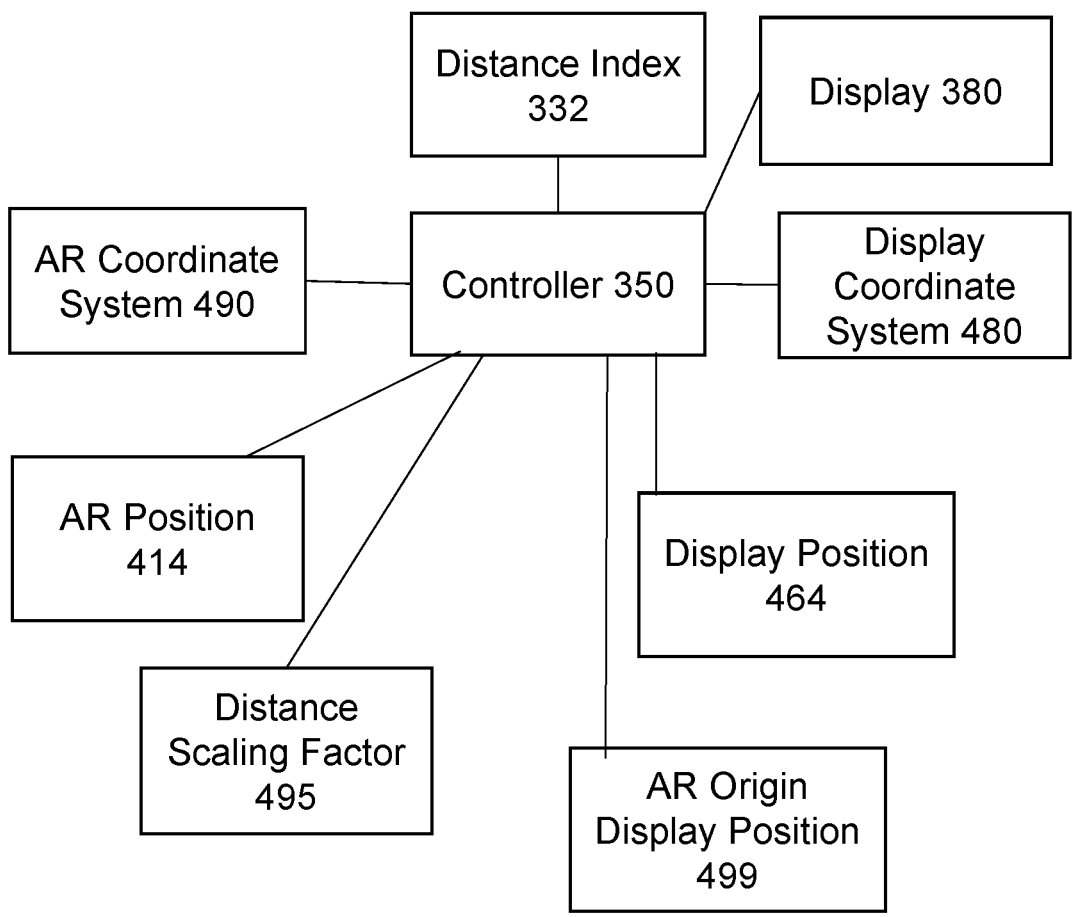
FIG. 4 illustrates an exemplary embodiment to generate an augmented reality coordinate system for an image.

FIG. 4 illustrates an exemplary embodiment to generate an augmented reality coordinate system for an image. In one embodiment, controller 350 generates an AR coordinate system 450 for a display coordinate system 480 for a display 380 based on distance index 332. In one embodiment, controller 350 includes an AR origin display position 499 which indicates a mapping of AR position (0, 0, 0) (or AR(0,0,0)) onto a display position in display coordinate system 480, and an AR z-axis on display coordinate system 480.

In one embodiment, controller 350 obtains AR position 414 AR(x,y,z) and maps AR(x,y,z) to display position 464 Display(x,y). AR(x,y,z) indicates a coordinate position (x,y, z) in AR coordinate system 490. We will refer occasionally the position AR(x,y,z) as (AR-x, AR-y, AR-z) in AR coordinate system 490. Display(x,y) indicates a coordinate position (x,y) in display coordinate system 480. We will refer the position Display(x,y) as (Display-x, Display-y) in display coordinate system 480.

In one embodiment, AR-z indicates a depth or a distance away from a viewpoint, such as the position of a user or a camera. In one embodiment, controller 350 calculates Distance scaling factor 495=Distance Index 332/AR-z In one embodiment, AR(x,y,z) is AR(36, 24, 72) where a unit in AR coordinate system represents an inch. AR(36, 24, 72) indicates a point 72 in or 6 ft away from camera 330, 36 in or 3 ft on the right of camera 330, and 24 in or 2 ft above camera 330. Using an earlier embodiment where distance index 332 is 3744, controller 350 calculates distance scaling factor 495 to be 52.

In one embodiment, AR(0,0,0) is pre-set at location Display(0,0), the position (0,0) in display coordinate system 480, and the z-axis of AR coordinate system 490 is orthogonal to the point Display(0,0), or the z-axis of AR coordinate system 490 is mapped onto the position Display(0,0). Controller 350 calculates (Display-x, Display-y) as:

Display-x=Distance scaling factor 495*AR-x

Display-y=Distance scaling factor 495*AR-y

Returning to an earlier embodiment of AR(36, 24, 72) and distance scaling factor 495 being 52, controller 350 calculates Display-x, Display-y to be 1872 and 1248 respectively.

In one embodiment, AR(0,0,0) is pre-set at location Display(x0,y0) in display coordinate system 480, and the z-axis of AR coordinate system 490 is orthogonal to the point Display(x0,y0), or the z-axis of AR coordinate system 490 is mapped onto the point Display(x0,y0). Controller 350 calculates Display(x,y) as:

Display-x=Distance scaling factor 495*AR-x+Display-x0

Display-y=Distance scaling factor 495*AR-y+Display-y0

In one embodiment, Display(x0,y0) is the point Display (300, 400) of display coordinate system 480. Using an earlier embodiment of AR(36, 24, 72) and distance scaling factor 495 being 52, controller 350 calculates Display-x and Display-y to be 2172 and 1648 respectively.

In one embodiment, AR(0,0,0) is mapped to Display(0,0), and AR(0,0,1) is mapped to Display(x1,y1). The line from Display(0,0) to Display(x1,y1) is the z-axis display line for the z-axis of AR coordinate system 490. In one embodiment, controller 350 maps AR position AR(0,0,z) to a point Display(x2,y2) on the z-axis display line.

In one embodiment, controller 350 calculates z1 being the closest integer to AR-z, where z1 is a power of 2, or 2^n. Controller 350 may compute:

$$n=\text{floor}(\log(AR\text{-}z)/\log \qquad (2))$$

$$z1=2\char`\^n$$

Controller 350 further calculates Display(x2,y2) using estimates:

Display-x2=Display-x1*[(3/2)^n+½*(3/2)^n*((AR-z-z1)/z1]

Display-y2=Display-y1*[(3/2)^n+½*(3/2)^n*((AR-z-z1)/z1]

Controller 350 then computes Display-x and Display-y as:

Display-x=Distance scaling factor 495*AR-x+Display-x2

Display-y=Distance scaling factor 495*AR-y+Display-y2

In one embodiment, AR(0,0,1) is mapped to Display(200, 300), and AR(x,y,z) is AR(4,3,6), where in this embodiment, a unit in AR coordinate system 490 represents a foot. Controller 350 calculates n to be 2, z1 to be 4, and estimates:

Display-$x2=200*[(3/2)^2+\frac{1}{2}*(3/2)^2*(6-4)/4]=563$

Display-$y2=300*[(3/2)^2+\frac{1}{2}*(3/2)^2*(6-4)/4]=844.5$ or about 845

In this embodiment, using distance scaling factor 495 is 52, controller 350 further computes Display-x=52*4+563=771 and Display-y=52*3+845=1001.

In one embodiment, AR(0,0,0) is mapped to Display(x0,y0), and AR(0,0,1) is mapped to Display(x1,y1). The line extending from Display(x0,y0) to Display(x1,y1) is the display line for the z-axis of AR coordinate system 490. In one embodiment, controller 350 maps AR position AR(0,0,z) to a point Display(x2,y2) on the z-axis display line.

In one embodiment, controller 350, upon calculating z1 and n as in a previous embodiment, calculates Display(x2,y2) using estimates:

Display-$x2$=Display-$x0$+(Display-$x1$−Display-$x0$)*$[(3/2)^n+\frac{1}{2}*(3/2)^n*((AR\text{-}z\text{-}z1)/z1]$ Display-$y2$=Display-$y0$+(Display-$y1$−Display-$y0$)*$[(3/2)^n+\frac{1}{2}*(3/2)^n*((AR\text{-}z\text{-}z1)/z1]$ Controller 350 then computes Display-x and Display-y as:

Display-$x$=Distance scaling factor 495*$AR$-$x$+Display-$x2$

Display-$y$=Distance scaling factor 495*$AR$-$y$+Display-$y2$

In one embodiment, AR(0,0,0) is mapped to Display(100,100) and AR(0,0,1) is mapped to Display(300,400). AR(x,y,z) is AR(5,2,9), where in this embodiment, a unit in AR coordinate system 490 represents a foot. Controller 350 calculates n to be 3, z1 to be 8, and estimates:

Display-$x2=100+(300-100)*[(3/2)^3+\frac{1}{2}*(3/2)^3*(9-8)/8]=817$

Display-$y2=100+(400-100)*[(3/2)^3+\frac{1}{2}*(3/2)^3*(9-8)/8]=1176$

In this embodiment, using distance scaling factor 495 is 52, controller 350 further computes Display-x=52*5+817=1077 and Display-y=52*2+1176=1280.

Figure 5:
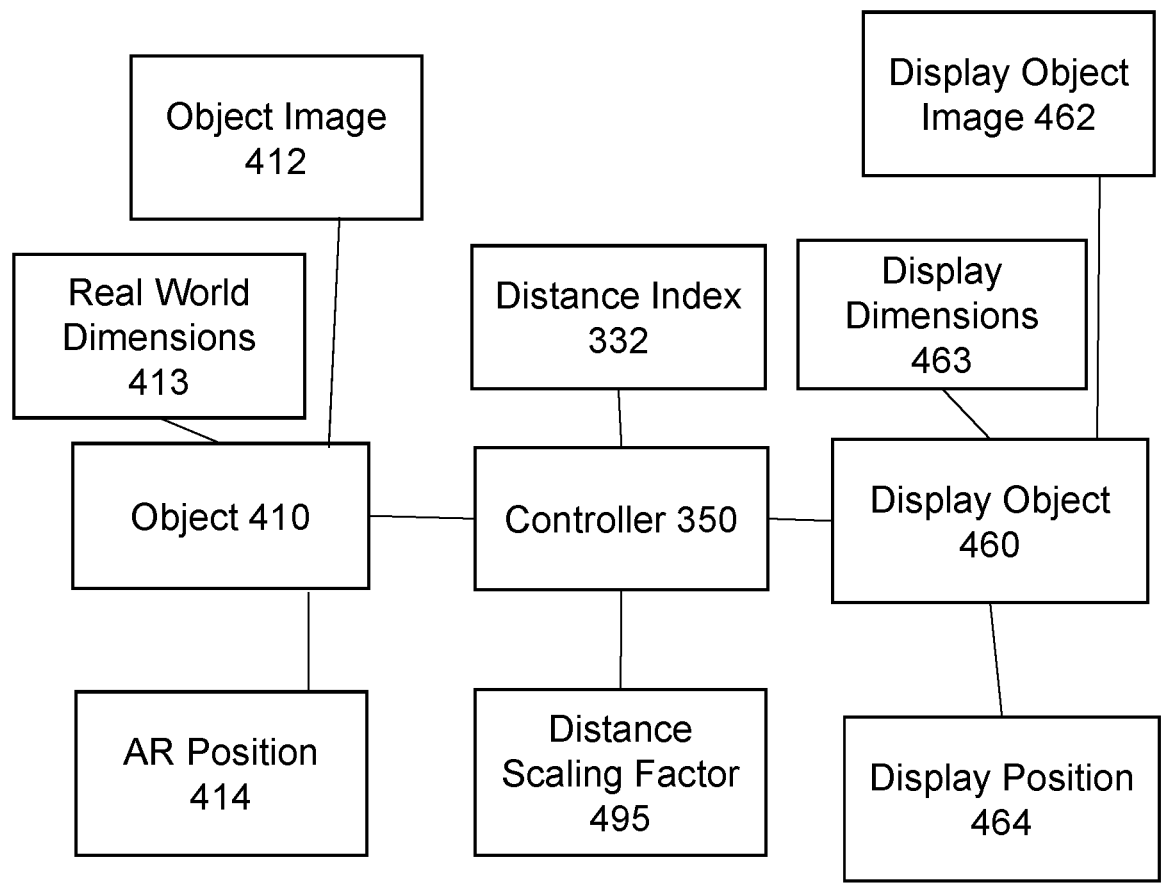
FIG. 5 illustrates an exemplary embodiment to generate a display object image for an object with real world dimension at an augmented reality position.

FIG. 5 illustrates an exemplary embodiment to generate a display object image of an object with real world dimensions at an augmented reality position. In one embodiment, controller 350 is to display object 410. In one embodiment, object 410 has real world dimensions 413 and an object image 412 corresponding to real world dimensions 413. In one embodiment, object image 412 is generated through an animation software and controller 350 generates object image 412 using the animation software instructions.

In one embodiment, object 410 is placed at an AR position 414. In one embodiment, AR position 414 is pre-determined and controller 350 retrieves AR position 414 from a data store. In one embodiment, controller 350 receives AR position 414 from a network computer, a user input, or a software application. In one embodiment, controller 350 generates AR position 414 according to animation programming instructions.

In one embodiment, controller 350 generates a display object 460, where the display object 460 is associated with a display position, display dimensions, and a display image corresponding to object 410, as described further below. In one embodiment, controller 350 calculates distance scaling factor 495 and display position 464 from AR position 414, as described above with reference to FIG. 3a. Controller 350 places display object 460 at display position 464. In one embodiment, controller calculates display dimensions 463 from real world dimensions 413 as:

Display dimensions 463=distance scaling factor 495*real world dimensions 413.

The controller 350 associates the display dimensions 463 with the display object 460.

In embodiment, distance scaling factor 495 is 52, object 410 includes a rectangular shape where real world dimensions 413 of the rectangular shape of object 410 has a width of 9 inches and a height of 7 inches. Display dimensions 463 of real world dimensions 413 is calculated to have a width of 468 pixels and a height of 364 pixels.

In one embodiment, controller 350 converts object image 412 to display object image 462 by scaling object image 412 from real world dimensions 413 to display dimensions 463. In one embodiment, controller 350 scales display object image 462 by applying a scaling factor of 2, 0.3, or 1.4 to object image 412. In one embodiment, controller 350 scales display object image 462 by applying a horizontal scaling factor of 1.72, 0.65, or 1.5 and a different vertical scaling scale of 1.36, 0.78, or 2.1.

In one embodiment, object image 412 has a size of 1024×768 pixels and display dimensions 463 have a size of 468×364 pixels. The horizontal scaling factor is 468/1024 and the vertical scaling factor is 364/768. Controller 350 applies the horizontal scaling factor and vertical scaling factor to object image 412 to generate display object image 462.

Figure 6:
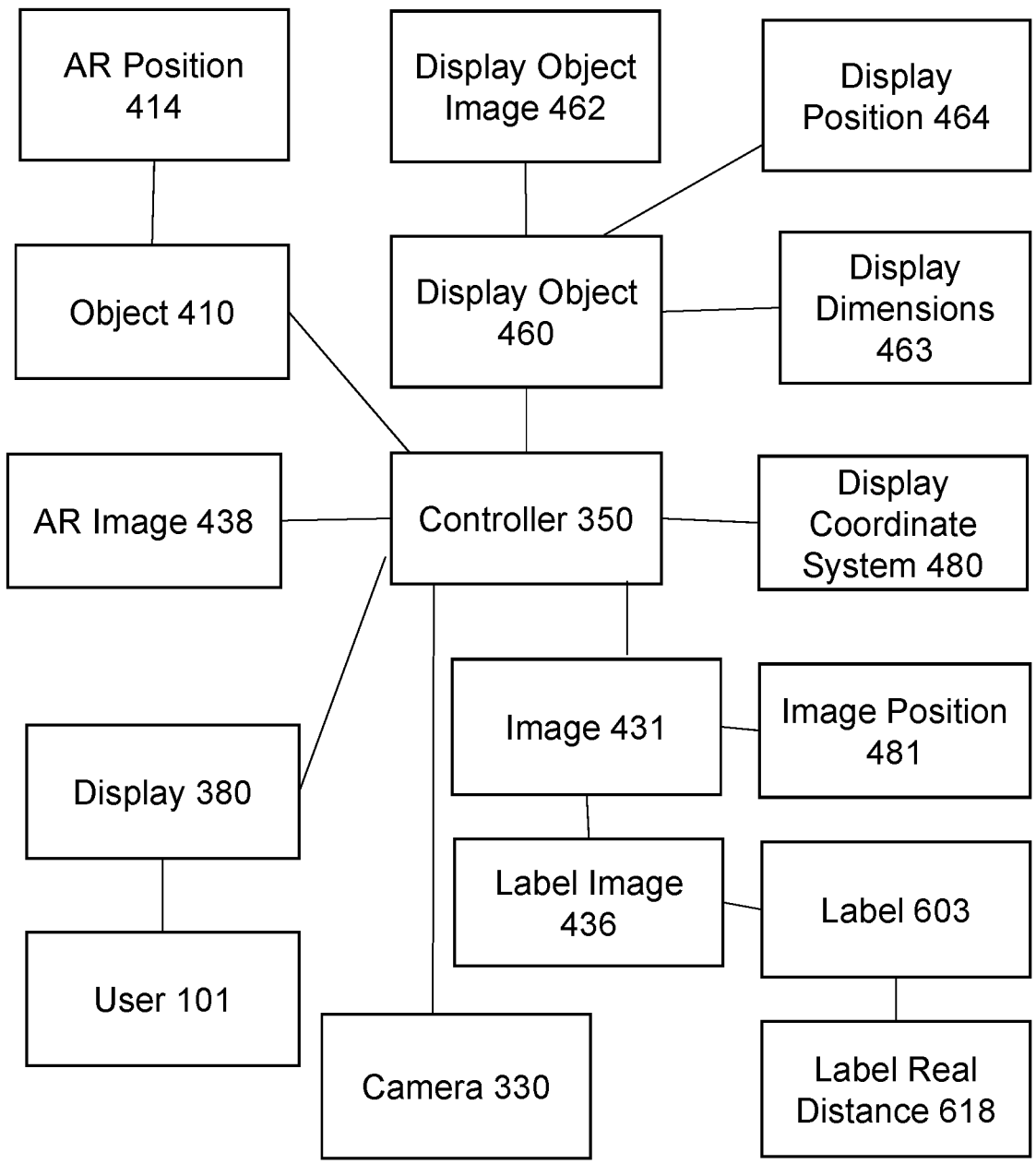
FIG. 6 illustrates an exemplary embodiment of presenting an object in an augmented reality view over an image.

FIG. 6 illustrates an exemplary embodiment of presenting an object in an augmented reality view over an image. In one embodiment, controller 350 creates an AR image 438 to be displayed on display 380 by combining object 410 onto image 431. In one embodiment, controller 350 processes object 410 to generate display object 460, as described above with reference to FIG. 5. Display object 460 is associated with a display object image 462, a display position 464 and display dimension 463 in display coordinate system 480.

In one embodiment, controller 350 retrieves image 431 and combines display object image 462 with image 431. In one embodiment, controller 350 receives image 431 from a connected camera 330. In one embodiment, controller 350 obtains image 431 from a data store. In one embodiment, controller 350 determines image 431 to be at an image position 481 in display coordinate system 480.

In one embodiment, controller 350 generates AR image 438. Controller 350 places image 431 into AR image 438 at image position 481, and display object image 462 into AR image 438 at display position 464. In one embodiment, controller 350 overlays display object image 462 on top of image 431 in AR image 438. In one embodiment, image 431 includes a label image 436 associated with a label 603, where the label image 436 is used as a reference. In one embodiment, controller 350 determines a label real distance 618 of label 603 as illustrated in FIG. 3b. In one embodiment, controller 350 obtains label real distance 618 from a user input, a data store, a piece of software programming instructions, or another computing device. In one embodiment, controller 350 compares label real distance 618 with AR-z of AR position 414 of object 410. In one embodiment, controller 350 determines AR-z of AR position 414 is smaller than label real distance 618. That is, object 410 appears closer to user 101 than label 603. Controller 350 overlays display object image 462, representing object 410, on top of label image 436 in AR image 438. The image overlay suggests to user 101 object 410 is closer than label 603.

In one embodiment, label real distance 618 is smaller than AR-z of AR position 414. In one embodiment, controller 350 does not place display object image 462 into AR image 438 or overlay image 431 over display object image 462 in AR image 438. Instead, controller 350 overlays display object image 462 over image 431 in AR image 438, and then overlays label image 436 on top of display object image 462 at the position of label image 436 in image 431. The image overlay suggests to user 101 object 410 is further away from label 603.

In one embodiment, upon generating AR image 438, controller 350 displays AR image 438 onto display 380.

FIG. 7 illustrates exemplary embodiments of objects. In one embodiment, object 410 can be a real world object, such as a table, a chair, a cup, a lamp, a car or any real world object. In one embodiment, object 410 can be a 14"×10" picture, an 8"×6" picture frame, a 3×5" photo, a 3'×2' flag.

In one embodiment, object 410 can be a 12" ruler or a 1 meter ruler with AR position near a recognized label or object in the image. The overlay image suggests a real world length of the label or object. In one embodiment, object 410 can be a 5 feet long measuring tape such that a user can interactively extend the measuring tape to measure the recognized object or other objects seen in the image. In one embodiment, object 410 can be a 3D (1×1×1 feet) ruler, a 3D (1×1×1 meter) measuring tape or a 3D ruler grid, assisting a user to measure or estimate the 3D dimensions of an object in the image.

In one embodiment, object 410 can be an animated object or a video.

In one embodiment, object 410 includes two or more objects. In one embodiment, object 410 includes a 50"-television set object and a video object to be positioned on a 40-50" television set, suggesting the television set object is playing the video object. In one embodiment, object 410 includes a plurality of videos or animations of several cats, small animals, or animated animals or monsters with real world sizes. The videos and animations suggest a roomful of pets running around a recognized object in an image. In one embodiment, the image is a current image of a plurality of images continuously captured from a camera. In one embodiment, the videos and animations suggest a roomful of pets running around a recognized cheerful running toddler in the image.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An augmented reality (AR) system comprising:
   a display having a two-dimensional (2D) display coordinate system; and
   a controller configured to:
   (a) receive an image from a camera;
   (b) obtain a distance index for the camera;
   (c) receive an instruction to display an object image onto the image on the display, the object image being associated with an object; and
   (d) in response to the instruction:
      (d1) retrieve real world dimensions of the object;
      (d2) obtain a three-dimensional (3D) AR position of the object in a 3D AR coordinate system, the 3D AR position comprising a depth coordinate indicating a distance between a real world viewpoint and the object;
      (d3) calculate a distance scaling factor based on a ratio of the distance index and the depth coordinate;
      (d4) calculate a 2D display position in the 2D display coordinate system for the 3D AR position, based on the distance scaling factor and a mapping of the depth coordinate of the 3D AR position onto the 2D display coordinate system according to a mapping of a depth-axis of the 3D AR coordinate system onto the 2D display coordinate system, wherein the mapping of the depth-axis of the 3D AR coordinate system onto the 2D display coordinate system comprises mapping a unit in the depth axis of the 3D AR coordinate system to a unit in a line in the 2D display coordinate system, wherein the line in the 2D display coordinate system is a depth-axis display line in the 2D display coordinate system for the depth-axis of the 3D AR coordinate system;
      (d5) calculate display dimensions for the object based on the distance scaling factor and the real world dimensions of the object;
      (d6) generate a display object image by scaling the object image to the display dimensions; and
      (d7) display the display object image and the image onto the display, wherein the display object image is displayed at the 2D display position.

2. The system of claim 1, wherein the mapping of the unit in the depth-axis of the 3D AR coordinate system comprises:
   a mapping of a first position on the depth axis in the 3D AR coordinate system to a first 2D position in the 2D display coordinate system;
   a mapping of the unit in the depth axis of the 3D AR coordinate system to a second 2D position in the 2D display coordinate system, wherein a line from the first 2D position to the second 2D position is the depth-axis display line in the 2D display coordinate system for the depth-axis of the 3D AR coordinate system.

3. The system of claim 1, wherein in the obtain (b), the controller is configured to: (b1) calculate the distance index using one or more camera attributes.

4. The system of claim 1, wherein in the generate (d6) and the display (d7), the controller is configured to:
   (d6i) generate the display object image by scaling the object image to the display dimensions;
   (d6ii) generate an AR image comprising a combination of the display object image and the image; and
   (d7i) display the AR image onto the display, wherein the display object image is displayed at the 2D display position.

5. The system of claim 4, wherein in the generate (d6ii), the controller is configured to:
   (d6iiA) overlay the display object image on the image at the 2D display position.

6. The system of claim 4, wherein in the generate (d6ii), the controller is configured to:
   (d6iiA) generate the AR image by placing the display object image between two sub-images of the image.

7. A method for displaying objects with real world dimensions in an augmented reality (AR) system, comprising:
   (a) receiving, by a controller, an image from a camera;
   (b) obtaining, by the controller, a distance index for the camera;
   (c) receiving, by the controller, an instruction to display an object image onto the image on a display, the display having a two-dimensional (2D) display coordinate system, the object image being associated with an object; and
   (d) in response to the instruction:
      (d1) retrieving, by the controller, real world dimensions of the object;
      (d2) obtaining, by the controller, a three-dimensional (3D) AR position of the object in a 3D AR coordinate system, the 3D AR position comprising a depth coordinate indicating a distance between a real world viewpoint and the object;
      (d3) calculating, by the controller, a distance scaling factor based on a ratio of the distance index and the depth coordinate;
      (d4) calculating, by the controller, a 2D display position in the 2D display coordinate system for the 3D AR position, based on the distance scaling factor and a mapping of the depth coordinate of the 3D AR position onto the 2D display coordinate system according to a mapping of a depth-axis of the 3D AR coordinate system onto the 2D display coordinate system, wherein the mapping of the depth-axis of the 3D AR coordinate system onto the 2D display coordinate system comprises mapping a unit in the depth axis of the 3D AR coordinate system to a unit in a line in the 2D display coordinate system, wherein the line in the 2D display coordinate system is a depth-axis display line in the 2D display coordinate system for the depth-axis of the 3D AR coordinate system;
      (d5) calculating, by the controller, display dimensions for the object based on the distance scaling factor and the real world dimensions of the object;
      (d6) generating, by the controller, a display object image by scaling the object image to the display dimensions; and
      (d7) displaying, by the controller, the display object image and the image onto the display, wherein the display object image is displayed at the 2D display position.

8. The method of claim 7, wherein the mapping of the unit in the depth-axis of the 3D AR coordinate system comprises:
   a mapping of a first position on the depth axis in the 3D AR coordinate system to a first 2D position in the 2D display coordinate system;
   a mapping of the unit in the depth axis of the 3D AR coordinate system to a second 2D position in the 2D display coordinate system, wherein a line from the first 2D position to the second 2D position is the depth-axis display line in the 2D display coordinate system for the depth-axis of the 3D AR coordinate system.

9. The method of claim 7, wherein the obtaining (b) comprises: (b1) calculating, by the controller, the distance index using one or more camera attributes.

10. The method of claim 7, wherein the obtaining (b) comprises: (b1) retrieving, by the controller, the distance index stored in the image.

11. The method of claim 7, wherein the generating (d6) and the displaying (d7) comprise:
(d6i) generating, by the controller, the display object image by scaling the object image to the display dimensions;
(d6ii) generating, by the controller, an AR image comprising a combination of the display object image and the image; and
(d7i) displaying, by the controller, the AR image onto the display, wherein the display object image is displayed at the 2D display position.

12. The method of claim 11, wherein the generating (d6ii) comprises:
(d6iiA) overlaying, by the controller, the display object image on the image at the 2D display position.

13. The method of claim 11, wherein the generating (d6ii) comprises:
(d6iiA) generating, by the controller, the AR image by placing the display object image between two sub-images of the image.

14. The method of claim 7, wherein the object comprises a ruler or a measuring tape, wherein the 2D display position is proximate to a second object in the image recognizable by the controller.

15. A non-transitory computer readable medium comprising computer readable program code embodied therein for displaying objects with real world dimensions in an augmented reality (AR) system, wherein when executed by a processor causes the processor to:
(a) receive an image from a camera;
(b) obtain a distance index for the camera;
(c) receive an instruction to display an object image onto the image on a display, the display having a two-dimensional (2D) display coordinate system, the object image being associated with an object; and
(d) in response to the instruction:
(d1) retrieve real world dimensions of the object;
(d2) obtain a three-dimensional (3D) AR position of the object in a 3D AR coordinate system, the 3D AR position comprising a depth coordinate indicating a distance between a real world viewpoint and the object;
(d3) calculate a distance scaling factor based on a ratio of the distance index and the depth coordinate;
(d4) calculate a 2D display position in the 2D display coordinate system for the 3D AR position, based on the distance scaling factor and a mapping of the depth coordinate of the 3D AR position onto the 2D display coordinate system according to a mapping of a depth-axis of the 3D AR coordinate system onto the 2D display coordinate system, wherein the mapping of the depth-axis of the 3D AR coordinate system onto the 2D display coordinate system comprises mapping a unit in the depth axis of the 3D AR coordinate system to a unit in a line in the 2D display coordinate system, wherein the line in the 2D display coordinate system is a depth-axis display line in the 2D display coordinate system for the depth-axis of the 3D AR coordinate system;
(d5) calculate display dimensions for the object based on the distance scaling factor and the real world dimensions of the object;
(d6) generate a display object image by scaling the object image to the display dimensions; and
(d7) display the display object image and the image onto the display, wherein the display object image is displayed at the 2D display position.

16. The medium of claim 15, wherein the mapping of the unit in the depth-axis of the 3D AR coordinate system comprises:
a mapping of a first position on the depth axis in the 3D AR coordinate system to a first 2D position in the 2D display coordinate system;
a mapping of the unit in the depth axis of the 3D AR coordinate system to a second 2D position in the 2D display coordinate system, wherein a line from the first 2D position to the second 2D position is the depth-axis display line in the 2D display coordinate system for the depth-axis of the 3D AR coordinate system.

17. The medium of claim 15, wherein the obtain (b) comprises: (b1) calculate the distance index using one or more camera attributes.

18. The medium of claim 15, wherein the generate (d6) and the display (d7) comprise:
(d6i) generate the display object image by scaling the object image to the display dimensions;
(d6ii) generate an AR image comprising a combination of the display object image and the image; and
(d7i) display the AR image onto the display, wherein the display object image is displayed at the 2D display position.

* * * * *